United States Patent [19]

Breeze

[11] 4,214,185
[45] Jul. 22, 1980

[54] LIGHT SOURCES

[76] Inventor: Alan G. Breeze, 76 Greenfields Ave., Alton, Hampshire, England

[21] Appl. No.: 949,497

[22] Filed: Oct. 10, 1978

[51] Int. Cl.² ............................................ H05B 37/00
[52] U.S. Cl. ...................................... 315/86; 362/20; 362/183; 362/398
[58] Field of Search ..................... 315/86; 362/20, 183, 362/191, 226, 398; 307/66

[56] References Cited

U.S. PATENT DOCUMENTS

| | | | |
|---|---|---|---|
| 1,568,947 | 1/1926 | Little | 362/398 |
| 2,668,228 | 2/1954 | Levinson et al. | 362/20 |
| 3,217,156 | 11/1965 | Sherwood | 362/183 |
| 3,591,796 | 7/1971 | Barker | 315/86 X |

Primary Examiner—Eugene R. LaRoche

[57] ABSTRACT

A light source arranged to be illuminated automatically upon failure of the normal electricity supply to a room, building or the like. The light source comprises a lamp housing containing a bulb, batteries and switch, and a base on which the lamp housing can be mounted. One part of an electromagnet including an energizing winding is mounted in the base and the other part is mounted in the torch housing such that when the housing is mounted on the base and an a.c. supply is made to the base, the two parts of the electromagnet are mutually attracted and the housing is held securely on the base. If the a.c. supply is interrupted the electromagnet is de-energized, allowing the housing to be removed from the base and, at the same time, the switch is operated to connect the batteries to supply current to the bulb.

11 Claims, 3 Drawing Figures

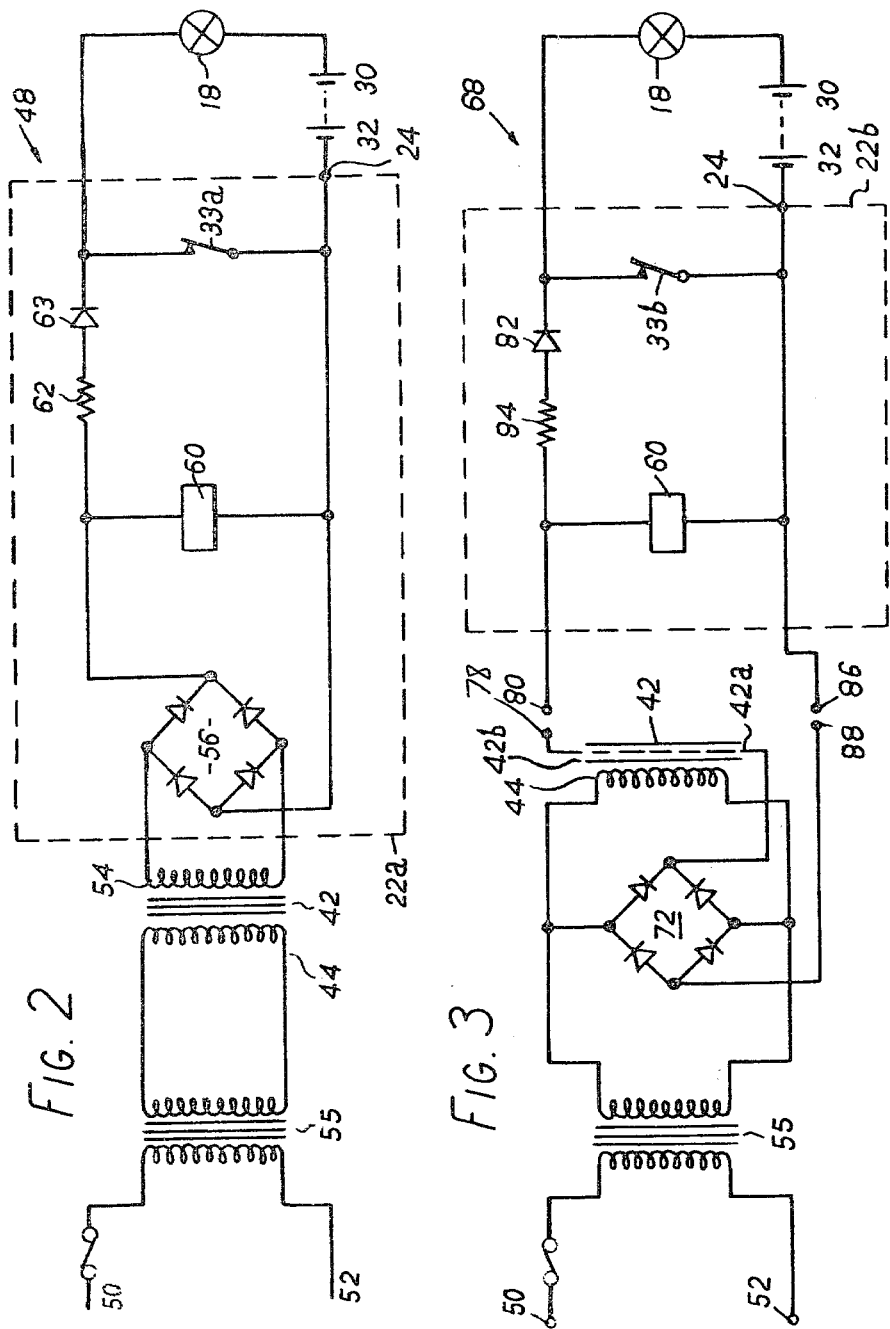

LIGHT SOURCES

BACKGROUND OF THE INVENTION

This invention relates to light sources and concerns light sources suitable for use as emergency or standby lighting.

There is a need for a cheap and simple light source for use in buildings, which comes into operation automatically when the normal a.c. mains supply for the building is cut-off for any reason. The need for such a light source is particularly great in relatively large buildings, such as hotels and hospitals, where the occupants may not be familiar with the lay-out of the building or with the escape routes in the case of fire or the like. There is also a need for a portable light source which is normally secured in a predetermined position in the building but which is released for use in the event of a failure in the a.c. mains supply.

SUMMARY OF THE INVENTION

According to the invention there is provided a light source which is released to function when a powering a.c. supply is cut-off. The source includes a housing mounted on a base member for receiving a lamp, an electrical power source independent of the a.c. supply for illuminating the lamp and a switching device for selectively coupling the power source to the lamp.

The switching device is preferably controlled by a control means operable by the a.c. supply such that when the housing is mounted on the base member and the a.c. supply is connected, the power source is disconnected from the lamp bulb. When the a.c. supply is disconnected or the housing is removed from the base member, the power source is connected automatically to illuminate the lamp bulb.

In a preferred embodiment of a light source according to the invention, the power source comprises a rechargeable battery and the control means is a control circuit arranged to supply a charging current to the battery when the a.c. supply is coupled thereto and the housing is mounted on the mounting means. To facilitate this, the switching device may be arranged to connect the battery to the lamp bulb when the a.c. source is disconnected or the housing is removed from the base member and to connect the battery to a source of a charging current when the housing is mounted on the base member and the a.c. supply is connected.

The switching device may comprise a reed relay or a conventional electromagnetic relay operated when the a.c. supply is applied. Alternatively, the switching device may comprise a semiconductor switch having two states of conductivity dependent upon the presence or absence of the a.c. supply.

BRIEF DESCRIPTION OF THE DRAWINGS

The invention will now be described by way of example with reference to the accompanying drawings, in which:

FIG. 2 is a circuit diagram of a control circuit for use in the source of FIG. 1.

FIG. 3 is a circuit diagram of another control circuit for use in the source of FIG. 1.

DETAILED DESCRIPTION

Figure 1:
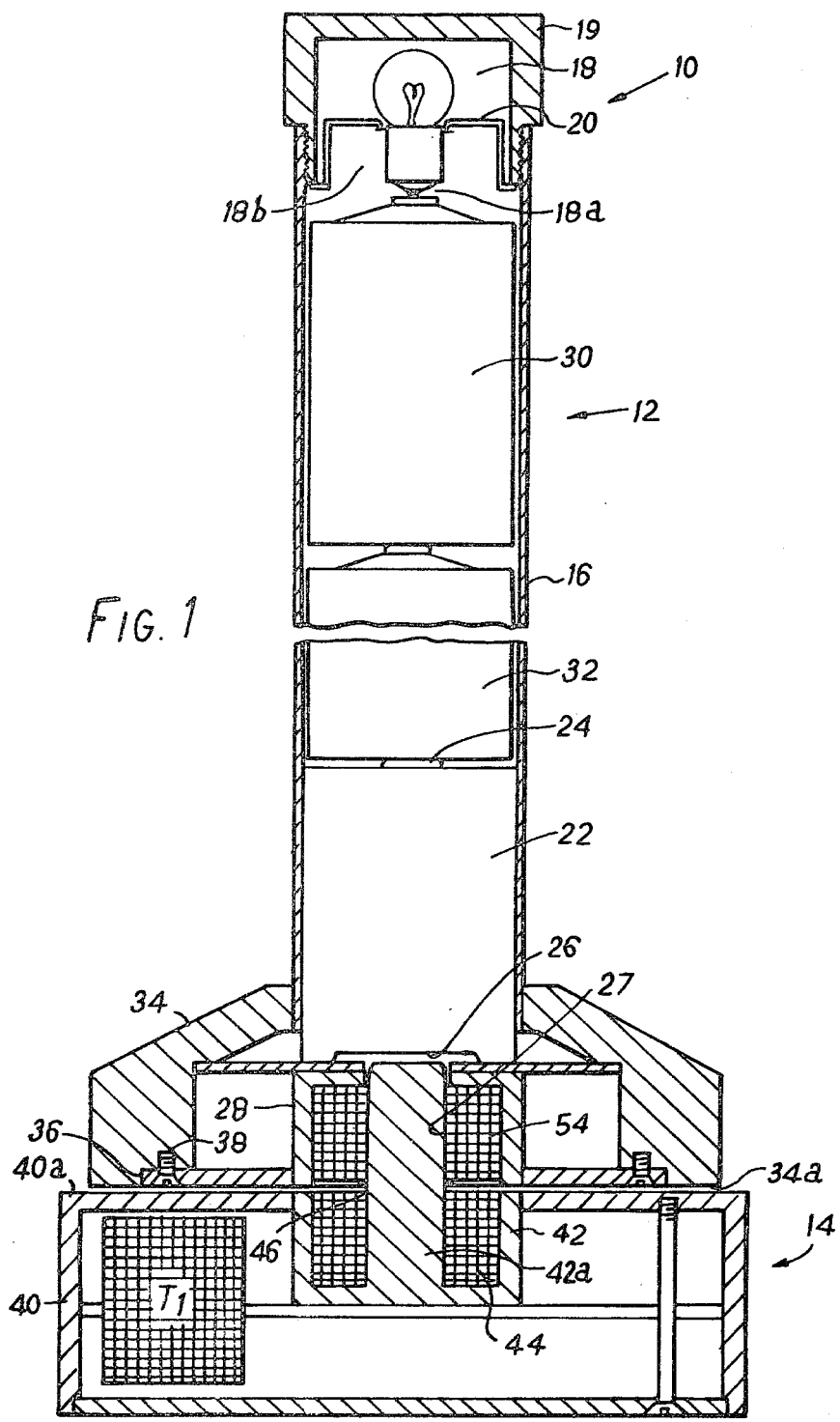
FIG. 1 is a side, sectional view of one embodiment of a light source according to the invention.

Referring to the drawings there is shown a light source 10 comprising a lamp housing 12 detachably mounted on a base 14.

The housing 12 comprises a hollow, cylindrical aluminum body 16 having a lamp bulb 18 and bulb holder 20 mounted at one end thereof, together with a transparent cover 19 of a suitable clear plastic material. The cover is removable to facilitate replacement of a bulb, but can be locked in position by various means to prevent unauthorized access to the bulb. The other end of the body 16 is closed by a control unit 22 having a spring-loaded contact terminal 24 on its inner end and having a recess 26 formed in its outer end. A part 28 of a split electromagnet/transformer is mounted at the base of the control unit 22 for a purpose to be described. Two rechargeable batteries 30, 32 are arranged in series between a terminal 18a of the bulb 18 and the terminal 24. A switch 33a (FIG. 2) or 33b (FIG. 3) is mounted in the control unit 22 and is coupled between the terminal 24 and the body 16 or a wire connection may be employed to complete the circuit to the outer terminal 18b of the bulb by way of bulb holder 20.

A relatively heavy frusto-conical aluminum member 34 is permanently fixed to the lower end (in FIG. 1) of the body 16, as by a screw thread or interference fit, to add stability to the lamp housing 12 when it is mounted vertically on the base 14. An apertured plate 36 is fixedly secured as by screws 38 to a recess in the lower surface 34a of the member 34 to retain the control unit 22 and part 28 of the electromagnet/transformer and may be locked in position to prevent unauthorized removal of or tampering with the control unit.

The base 14 comprises a hollow aluminum body 40 which houses the other part 42, 42a of the electromagnet/transformer and its primary, energizing coil 44. The coil 44 is provided with terminals (not shown) for connection to an a.c. supply such as the 60 Hz a.c. supply of a room or area in which the light source 10 is to be used.

The center of the electromagnet/transformer extends out of an aperture 46 formed in the upper wall 40a of the body 40 and is so dimensioned that it has a sliding fit into an aperture 27 formed in the secondary winding 54 and part 28 of the electromagnet/transformer 42.

Thus, when the housing 12 is mounted on the base 14, the part 42a extends into the housing 12 to restrict lateral movement of the housing and when the coil 44 is energized, the part 42, 42a of electromagnet/transformer attracts the other half 28, which may be spring-loaded to accommodate variations in the length of the electromagnet/transformer to prevent the housing 12 from being lifted easily from the base 14.

If the a.c. supply to the coil 44 is disconnected or if the housing 12 is removed from the base 14, the switch 33a or 33b, as the case may be, is operated to make the circuit between batteries 30, 32 and the bulb 18, thereby illuminating the bulb in a manner to be described.

Referring now to FIG. 2, there is shown a circuit diagram of one embodiment of a circuit 48 for use in the invention. The circuit 48 comprises the electromagnet/transformer 42 with windings 44, 54, a control circuit shown within broken line 22a and mounted in the control unit 22, the batteries 30, 32 and the bulb 18. The coil 44 is provided with terminals 50, 52 for connection to a 240 volt, 60 Hz or other a.c. supply by way of a transformer 55 to energize the electromagnet. Assuming that the lamp housing 12 is mounted on the base 14 as shown in FIG. 1, the a.c. supply causes a corresponding a.c. voltage to be induced in the winding 54. The a.c. voltage induced in coil 54 is rectified by bridge rectifier 56, and the rectified voltage applied to energize a relay coil 60. The energized relay coil 60 opens a connection switch 33a to connect one terminal of the bulb 18 to the rectified voltage by way of a resistor 62 and a reverse current protection diode 63. This operation of the switch 33a breaks the direct connection between the battery and the bulb 18 but makes a circuit from the rectifier 56 to the batteries 30, 32 by way of the bulb 18. The polarity of the resulting current through the batteries 30, 32 is sufficient to charge them but its magnitude is not great enough to illuminate the bulb.

In the case of a mains failure or the removal of the lamp housing 12 from the base 14, relay coil 60 is de-energized, the switch 33a reverts to the position shown in FIG. 2 and the bulb 18 is thus illuminated by the batteries 30, 32. The diode 63 prevents the batteries 30, 32 making a reverse current through the relay 60. The bulb 18 will remain illuminated until the housing 12 is returned to the base 14 when it will be switched off automatically if the a.c. supply is connected to terminals 50, 52.

The switch 33a could be arranged to be operated by the magnetic field of the electromagnet 42, thus obviating the need for coil 60.

The transformer 55 is an optional extra for two reasons: (1) to give isolation from the main imput supply, and (2) to allow a lower voltage to energize coil 44 thereby allowing heavier gauge wire to be used.

Referring now to FIG. 3, there is shown a circuit diagram of another embodiment of a circuit 68 for use in the invention. Like parts in FIG. 2 and FIG. 3 are given like references. The circuit 68 comprises the electromagnet 42, coil 44, a control circuit shown within broken line 22b and mounted in the control unit 22, the batteries 30, 32 and the bulb 18. The coil 44 is provided with terminals 50, 52 for connection to a 240 volt, 60 Hz supply by way of a transformer 55 to energize the electromagnet 42. The a.c. voltage is rectified by a bridge rectifier 72. The rectified voltage is coupled to one end 42a of the electromagnet 42, the other end 42b of which is coupled to a terminal 78. When the housing 12 is placed in position on the base 14, the terminal 78 is connected to a terminal 80 on the housing 12 and then the circuit is completed through a resistor 84, a diode 82 poled as shown, bulb 18, the batteries 30, 32, a terminal 86 on the housing 12, and a terminal 88.

Assuming that the housing 12 is on the base 14, and the a.c. supply is connected to terminals 50, 52, the electromagnet/transformer is energized to attract the other half of electromagnet piece 28. Relay 60 is energized to open contact 33b to disconnect the direct connection between the batteries and the bulb 18, and to make the circuit between the batteries 30, 32, the bulb 18, a diode 82, and resistor 84. The resulting current from the rectifier 72 is of the correct polarity to charge the batteries 30, 32, but its magnitude is insufficient to illuminate the bulb. The diode 82 is provided as a safety device to prevent reverse charging.

In the case of a mains failure or the removal of the lamp housing 12 from the base 14, the electromagnet 42 is de-energized. Relay 60 de-energizes and the switch 33b reverts to the closed position and the bulb 18 is thus illuminated by the batteries 30, 32. The bulb 18 will remain illuminated until the housing 12 is returned to the base 14, when it will be switched off automatically if the a.c. supply is connected to terminals 50, 52.

In the circuits of FIG. 2 and FIG. 3, the relay switches 33a, 33b could be replaced by semiconductor switches or reed relays with a corresponding modification in the circuit.

Other modifications and embodiments of the invention are, of course, possible. For example, instead of using a split core electromagnet, an electromagnet could be mounted in one of the body 14 or housing 12 and a soft iron pole piece could be mounted in the other of the body 14 or housing 12 such that when the electromagnet is energized, it attracts the soft iron pole piece and firmly secures the torch housing 12 to the body 14.

Furthermore, the transformer 42 can be arranged merely to supply an a.c. current to the control unit 22 but to provide little or no attraction between the housing 12 and base 14, in which case the housing could be readily removed from the base or other securing means could be provided normally to secure the two parts together.

The housing 12 and base 14 could also be manufactured from a suitable plastic material.

While one advantageous embodiment has been chosen to illustrate the invention, it will be understood by those skilled in the art that various changes and modifications can be made therein without departing from the scope of the invention as defined in the appended claims.

I claim as my invention:

1. A light source comprising a lamp bulb, an electrical power source for illuminating the lamp bulb, a housing for containing said lamp bulb and said power source, a surface for supporting said housing, switch means for selectively coupling the power source to said bulb, control means for controlling said switch means, said control means being coupled to and operated by an a.c. supply such that when said housing is mounted on the supporting surface and the a.c. supply is maintained, said power source is disconnected from the bulb, and when the a.c. supply is interrupted, said power source is connected to illuminate the bulb, means for securing said housing on said supporting surface, the securing means comprising transformer means having a magnetically attractable component and a magnetically attracting component, one of the components mounted on said supporting surface and the other of said components mounted in said housing, means coupling the a.c. supply to said transformer means to produce magnetic forces between said components, such magnetic forces being sufficient to secure said housing on said supporting surface but allowing manual separation of said housing from said supporting surface whether the a.c. supply is maintained or interrupted.

2. The light source according to claim 1 wherein said control means includes switching means for automatically connecting said power source to illuminate said bulb when said housing is removed from the mounting means.

3. A light source according to claim 2, wherein a transformer couples said a.c. supply to the control means.

4. A light source according to claim 3, wherein said securing means comprises an electromagnet fixedly mounted in one of said mounting means or said housing and arranged to be energized by the a.c. supply through said circuit means, said attraction means comprising a soft iron pole piece, fixedly secured and so arranged in the other of the housing or mounting means whereby, when the housing is mounted on the mounting means and the a.c. supply is connected, the electromagnet attracts the attractable component and thus secures the housing to the mounting means.

5. The light source according to claim 1 wherein said power source comprises a rechargeable battery and said control means includes circuitry for supplying a charging current derived from the a.c. supply to said battery when the a.c. supply is coupled thereto and said housing is mounted on said mounting means.

6. A light source according to claim 5, in which said switch means connects said battery to said bulb when the a.c. source is disconnected or said housing is removed from said mounting means and connects said battery to a said circuitry when said housing is mounted on said mounting means and the a.c. supply is connected.

7. A light source according to claim 4, wherein said electromagnet is mounted in said mounting means and is arranged with a part upstanding therefrom to engage in a recess formed in the housing, the attraction means mounted proximate the inner end of the recess.

8. A light source according to claim 1 wherein the switch means comprises a relay.

9. The light source according to claim 1 wherein said attracting component is formed by one part of a split magnetic core mounted stationary in one of the mounting means or said supporting surface, and further wherein said attractable component is formed by the other part of said split magnetic core fixedly secured in the other of the housing or said supporting surface.

10. The light source as claimed in claim 9 wherein said other component is a magnetic core having an aperture therein and further wherein said one component comprises a magnetic core having an elongate member extending therethrough to mate with said aperture.

11. A light source according to claim 9, in which the said one part of said core is mounted within the mounting means and includes a part projecting therefrom to engage in a recess formed within said attraction component.

* * * * *